US012392057B2

(12) United States Patent
Lee et al.

(10) Patent No.: US 12,392,057 B2
(45) Date of Patent: Aug. 19, 2025

(54) POLYESTER FIBER, PREPARAION METHOD THEREOF AND MOLDED ARTICLE FORMED THEREFROM

(71) Applicant: SK CHEMICALS CO., LTD., Gyeonggi-do (KR)

(72) Inventors: Boo-youn Lee, Gyeonggi-do (KR); Sung-Gi Kim, Gyeonggi-do (KR); Yoo Jin Lee, Gyeonggi-do (KR)

(73) Assignee: SK Chemicals CO., Ltd., Gyeonggi-do (KR)

( * ) Notice: Subject to any disclaimer, the term of this patent is extended or adjusted under 35 U.S.C. 154(b) by 0 days.

(21) Appl. No.: 18/490,393

(22) Filed: Oct. 19, 2023

(65) Prior Publication Data

US 2024/0044051 A1 Feb. 8, 2024

Related U.S. Application Data

(62) Division of application No. 16/616,078, filed as application No. PCT/KR2018/006322 on Jun. 1, 2018, now abandoned.

(30) Foreign Application Priority Data

Jun. 2, 2017 (KR) .................. 10-2017-0069239

(51) Int. Cl.

| | | |
|---|---|---|
| *C08G 63/672* | (2006.01) | |
| *B29C 48/00* | (2019.01) | |
| *B32B 27/08* | (2006.01) | |
| *C08G 63/183* | (2006.01) | |
| *C08G 63/86* | (2006.01) | |
| *C08J 5/18* | (2006.01) | |
| *C08K 3/04* | (2006.01) | |
| *C08K 3/24* | (2006.01) | |
| *C08K 3/32* | (2006.01) | |
| *C08K 5/098* | (2006.01) | |
| *D01D 5/098* | (2006.01) | |
| *D01F 1/09* | (2006.01) | |
| *D01F 1/10* | (2006.01) | |
| *D01F 6/62* | (2006.01) | |

(52) U.S. Cl.
CPC ............ *D01F 6/62* (2013.01); *C08G 63/183* (2013.01); *C08G 63/863* (2013.01); *C08K 3/04* (2013.01); *C08K 3/24* (2013.01); *C08K 3/32* (2013.01); *D01D 5/098* (2013.01); *D01F 1/09* (2013.01); *D01F 1/10* (2013.01); *D01F 1/106* (2013.01); *C08K 2003/329* (2013.01)

(58) Field of Classification Search
CPC .......... C08G 63/672; C08J 5/18; C08K 5/098; B32B 27/08; B32B 27/36; B29C 48/0018; B29C 48/08; B29C 55/143; D10B 2331/04; D01F 8/14; D01F 6/64; D01F 6/62

USPC .................................. 428/213, 220
See application file for complete search history.

(56) References Cited

U.S. PATENT DOCUMENTS

| | | | |
|---|---|---|---|
| 4,060,516 A | | 11/1977 | Kuratsuji et al. |
| 5,521,278 A | | 5/1996 | O'Brien et al. |
| 5,959,066 A | | 9/1999 | Charbonneau et al. |
| 6,025,061 A | | 2/2000 | Khanarian et al. |
| 6,063,464 A | | 5/2000 | Charbonneau et al. |
| 6,063,465 A | | 5/2000 | Charbonneau et al. |
| 6,063,495 A | * | 5/2000 | Charbonneau ....... C08G 63/672 264/211.14 |
| 6,126,992 A | | 10/2000 | Khanarian et al. |
| 6,140,422 A | * | 10/2000 | Khanarian ............ C08L 71/00 525/437 |
| 6,359,070 B1 | | 3/2002 | Khanarian et al. |
| 6,699,546 B2 | | 3/2004 | Tseng |
| 11,396,579 B2 | | 7/2022 | Lee et al. |
| 11,447,603 B2 | | 9/2022 | Lee et al. |
| 11,492,444 B2 | | 11/2022 | Lee et al. |
| 11,713,373 B2 | | 8/2023 | Lee et al. |
| 11,787,901 B2 | | 10/2023 | Lee et al. |
| 2003/0232959 A1 | | 12/2003 | Adelman et al. |
| 2004/0092697 A1 | * | 5/2004 | Kia ..................... C08G 18/3271 528/65 |
| 2004/0092703 A1 | | 5/2004 | Germroth et al. |
| 2007/0059465 A1 | | 3/2007 | Thompson et al. |
| 2007/0106055 A1 | * | 5/2007 | Kageyama ............ C08G 63/87 528/274 |
| 2009/0281230 A1 | | 11/2009 | Rasoul et al. |

(Continued)

FOREIGN PATENT DOCUMENTS

| | | |
|---|---|---|
| CA | 2940858 | 10/2015 |
| CN | 1298343 | 6/2001 |

(Continued)

OTHER PUBLICATIONS

International Search Report and Written Opinion for International (PCT) Patent Application No. PCT/KR2018/006111, dated Sep. 6, 2018, 13 pages.

(Continued)

*Primary Examiner* — Tahseen Khan

(74) *Attorney, Agent, or Firm* — Sheridan Ross, PC

(57) ABSTRACT

The present invention relates to a polyester fiber, a preparation method thereof and a molded article prepared therefrom. The polyester fiber comprises a diol moiety derived from isosorbide in a specific amount and is formed into a polyester resin having a specific oligomer content, thereby providing a molded article having excellent saline water resistance, chemical resistance, light resistance and good knot strength, and capable of maintaining high transparency.

6 Claims, No Drawings

(56) References Cited

U.S. PATENT DOCUMENTS

| | | |
|---|---|---|
| 2011/0214720 A1 | 9/2011 | Hashimoto et al. |
| 2012/0040167 A1 | 2/2012 | Kim et al. |
| 2012/0177854 A1 | 7/2012 | Lee et al. |
| 2012/0207993 A1 | 8/2012 | Joo et al. |
| 2013/0253165 A1 | 9/2013 | Matsumoto et al. |
| 2013/0295306 A1 | 11/2013 | Kim et al. |
| 2013/0319525 A1 | 12/2013 | Nakai |
| 2014/0011976 A1 | 1/2014 | Kim et al. |
| 2015/0087789 A1 | 3/2015 | Utsunomiya et al. |
| 2015/0148515 A1 | 5/2015 | Kim et al. |
| 2016/0130415 A1 | 5/2016 | Miyasaka |
| 2016/0185510 A1 | 6/2016 | Degroote et al. |
| 2016/0222157 A1 | 8/2016 | Lee et al. |
| 2017/0136747 A1 | 5/2017 | Torradas |
| 2017/0144420 A1 | 5/2017 | Lim et al. |
| 2017/0166746 A1 | 6/2017 | Maeda et al. |
| 2018/0155493 A1 | 6/2018 | Jacquel et al. |
| 2020/0173060 A1 | 6/2020 | Lee et al. |

FOREIGN PATENT DOCUMENTS

| | | |
|---|---|---|
| CN | 1298346 | 6/2001 |
| CN | 1298416 | 6/2001 |
| CN | 1298426 | 6/2001 |
| CN | 1298461 | 6/2001 |
| CN | 1711302 | 12/2005 |
| CN | 102498150 | 6/2012 |
| CN | 105392816 | 3/2016 |
| EP | 2857433 | 4/2015 |
| EP | 3395855 | 10/2018 |
| EP | 3441414 | 2/2019 |
| FR | 3036400 | 11/2016 |
| JP | S50-14818 | 2/1975 |
| JP | S50-18722 | 2/1975 |
| JP | H11-323658 | 11/1999 |
| JP | 2002-512304 | 4/2002 |
| JP | 2002-512315 | 4/2002 |
| JP | 2006-070101 | 3/2006 |
| JP | 2006-214057 | 8/2006 |
| JP | 2010-215770 | 9/2010 |
| JP | 2012-126821 | 7/2012 |
| JP | 2013-047317 | 3/2013 |
| JP | 5752617 | 7/2015 |
| JP | 5903980 | 4/2016 |
| JP | 2016-529171 | 9/2016 |
| KR | 10-2001-0034803 | 4/2001 |
| KR | 10-2001-0034804 | 4/2001 |
| KR | 10-2001-0034807 | 4/2001 |
| KR | 10-2001-0034808 | 4/2001 |
| KR | 10-2001-0034809 | 4/2001 |
| KR | 10-0504063 | 7/2005 |
| KR | 10-2006-0007447 | 1/2006 |
| KR | 10-2010-0113769 | 10/2010 |
| KR | 10-2011-0039185 | 4/2011 |
| KR | 10-2012-0072484 | 7/2012 |
| KR | 10-2015-0062234 | 6/2015 |
| KR | 10-2015-0077993 | 7/2015 |
| KR | 10-2016-0037940 | 4/2016 |
| KR | 10-2016-0079551 | 7/2016 |
| KR | 10-2016-0083399 | 7/2016 |
| KR | 10-2017-0037588 | 4/2017 |
| TW | 201615742 | 5/2016 |
| TW | 201700529 | 1/2017 |
| TW | 201713707 | 4/2017 |
| WO | WO 99/54119 | 10/1999 |
| WO | WO 2012/105770 | 8/2012 |
| WO | WO 2016/125860 | 8/2016 |

OTHER PUBLICATIONS

Translated International Search Report for International (PCT) Patent Application No. PCT/KR2018/006111, dated Sep. 6, 2018, 3 pages.
Extended Search Report for European Patent Application No. 18809897.4, dated Dec. 9, 2020, 7 pages.
International Search Report and Written Opinion for International (PCT) Patent Application No. PCT/KR2018/006858, dated Nov. 29, 2018, 12 pages.
Extended Search Report for European Patent Application No. 18819852.7, dated Mar. 11, 2021, 9 pages.
International Search Report and Written Opinion for International (PCT) Patent Application No. PCT/KR2018/006322, dated Sep. 10, 2018, 11 pages.
Translated International Search Report for International (PCT) Patent Application No. PCT/KR2018/006322, dated Sep. 10, 2018, 2 pages.
International Search Report for International (PCT) Patent Application No. PCT/KR2018/007177, dated Oct. 2, 2018, 2 pages.
International Search Report and Written Opinion for International (PCT) Patent Application No. PCT/KR2018/007177, dated Oct. 2, 2018, 10 pages.
Official Action for U.S. Appl. No. 16/615,500, dated Sep. 30, 2020 10 pages.
Official Action for U.S. Appl. No. 16/615,500, dated Mar. 23, 2021 10 pages.
Official Action for U.S. Appl. No. 16/615,500, dated Aug. 24, 2021 11 pages.
Official Action for U.S. Appl. No. 16/615,500, dated Jan. 27, 2022 8 pages.
Notice of Allowance for U.S. Appl. No. 16/615,500, dated May 16, 2022 8 pages.
Official Action for U.S. Appl. No. 16/624,148, dated Oct. 14, 2020 10 pages.
Official Action for U.S. Appl. No. 16/624,148, dated Mar. 23, 2021 10 pages.
Official Action for U.S. Appl. No. 16/624,148, dated Aug. 24, 2021 11 pages.
Official Action for U.S. Appl. No. 16/624,148, dated Jan. 27, 2022 8 pages.
Official Action for U.S. Appl. No. 16/624,148, dated Jul. 6, 2022 9 pages.
Official Action for U.S. Appl. No. 16/616,078, dated Oct. 20, 2020 12 pages.
Official Action for U.S. Appl. No. 16/615,078, dated Apr. 21, 2021 14 pages.
Official Action for U.S. Appl. No. 16/616,078, dated Aug. 27, 2021 11 pages.
Notice of Allowance for U.S. Appl. No. 16/616,078, dated Mar. 1, 2023 8 pages.
Official Action for U.S. Appl. No. 16/616,078, dated Apr. 12, 2022 10 pages.
Official Action for U.S. Appl. No. 16/616,078, dated Jul. 19, 2023 11 pages.
Official Action for U.S. Appl. No. 16/625,114, dated Oct. 13, 2020 11 pages.
Official Action for U.S. Appl. No. 16/625,114, dated Mar. 23, 2021 13 pages.
Official Action for U.S. Appl. No. 16/625,114, dated Aug. 25, 2021 10 pages.
Notice of Allowance for U.S. Appl. No. 16/625,114, dated Mar. 1, 2022 8 pages.
Official Action for U.S. Appl. No. 17/886,182, dated Dec. 2, 2022 7 pages.
Notice of Allowance for U.S. Appl. No. 17/886,182, dated Mar. 13, 2023 7 pages.
Official Action for U.S. Appl. No. 17/881,946, dated Dec. 8, 2022 7 pages.
Notice of Allowance for U.S. Appl. No. 17/881,946, dated Jun. 13, 2023 7 pages.

* cited by examiner

POLYESTER FIBER, PREPARAION METHOD THEREOF AND MOLDED ARTICLE FORMED THEREFROM

CROSS-REFERENCE TO RELATED APPLICATIONS

This application is a divisional of U.S. application Ser. No. 16/616,078, filed Nov. 22, 2019, which is a national stage application under 35 U.S.C. 371 and claims the benefit of PCT Application No. PCT/KR2018/006322 having an international filing date of 1 Jun. 2018, which designated the United States, which PCT application claims the benefit of priority from Korean Patent Application No. 10-2017-0069239 filed on Jun. 2, 2017 with the Korean Intellectual Property Office, the disclosures of each of which are incorporated herein by reference in their entireties.

The present invention relates to a polyester fiber, a preparation method thereof and a molded article prepared from the polyester fiber.

BACKGROUND

Polyamide, polyester, polyethylene, polyaramid, and the like have been widely used as typical synthetic fiber materials.

Polyamide fibers composed of polyamide resins such as nylon 6, nylon 66 and nylon 6/66 are flexible and strong, and thus have been used for fishing guts and fishing nets. However, the polyamide fibers composed of nylon 6, nylon 66 and nylon 6/66 have a specific gravity of 1.14, which is similar to the specific gravity of seawater. Thus, there are problems that fishing guts, fishing nets or the like made of polyamide fibers do not naturally sink in the sea, and that the tensile strength, knot strength or the like are deteriorated when they are brought into contact with seawater for a long time. Further, it is required to use expensive additives in order to ensure high transparency.

Meanwhile, PET (polyethylene terephthalate) represented by a polyester resin has a low price, excellent physical properties and a high specific gravity of 1.33. However, it has high crystallinity and thus requires a high temperature during processing, and there is a problem that transparency of a molded article such as a fishing gut with a thickness higher than a certain level cannot be secured. In addition, for applications such as pelt for paper machines, a certain level or more of resistance to alkaline chemicals is required, but PET has the disadvantage in that its strength is decreased with time when exposed to alkaline chemical and thus has a short replacement cycle.

Meanwhile, generally, as methods for preparing a molded article in which a specific color has been imparted to a fiber, there are two methods, namely, one method of dyeing a typical polyester fiber and then weaving it, and another method of dyeing after weaving. Since these two methods have different degrees of adsorption during dyeing process, there is a problem that dyeing of the final product is not uniformly performed.

Accordingly, the fibers used for fishing guts and fishing nets are required to have a fast settling speed, high resistance to seawater, high knot strength, high transparency or the like. In addition, in order to provide a pelt for paper machines, it is necessary to develop a material which is highly stable to alkali and thus can increase the replacement cycle. Therefore, there is a need to further study fibers which can increase settling speed, has excellent saline water resistance, chemical resistance and dyeability and exhibits a feature of high knot strength retention rate.

Technical Problem

The present invention provides a polyester fiber and a method for preparing the same.

The present invention also provides a molded article prepared from the polyester fiber.

Technical Solution

In order to achieve the objects above, according to one embodiment of the present invention, there is provided a polyester fiber formed from a polyester resin polymerized with a dicarboxylic acid including terephthalic acid or a derivative thereof and a diol including isosorbide, thereby having an alternating structure of an acid moiety derived from the dicarboxylic acid or a derivative thereof and a diol moiety derived from the diol, wherein the polyester resin includes 1 to 20 mol % of a diol moiety derived from isosorbide and 2 to 5 mol % of a diol moiety derived from diethylene glycol based on the total diol moieties derived from the diol, and wherein the polyester resin has an oligomer content of 1.3% by weight or less, and a haze of less than 3% as measured according to ASTM D1003-97 for a specimen having a thickness of 6 mm obtained from the polyester resin.

According to another embodiment of the present invention, there is provided a method for preparing the polyester fiber and a molded article prepared from the polyester fiber.

Advantageous Effects

The polyester fiber according to one embodiment of the present invention has a low oligomer content and is prepared into a specimen having a thickness of 6 mm, which is ultimately formed into a polyester resin exhibiting a haze of less than 3%, thereby providing a molded article having excellent saline water resistance, chemical resistance, light resistance and good knot strength and capable of maintaining high transparency. Therefore, the use of the polyester fiber can provide a molded article suitable for various uses such as fishing guts, fishing nets, pelt for paper machines, ropes, gut for rackets, carpets, rugs, mats, clothes, and 3D printers, etc.

DETAILED DESCRIPTION OF THE EMBODIMENTS

Hereinafter, a polyester fiber, a preparation method thereof, and a molded article prepared therefrom according to specific embodiments of the invention will be described.

Unless otherwise specified, the terminology used herein is for the purpose of describing particular embodiments only and is not intended to limit the scope of the invention. Further, the singular forms "a," "an" and "the" are intended to include the plural forms as well, unless the context clearly indicates otherwise. In addition, it will be further understood that the meaning of the terms "comprise", "include" as used herein is intended to specify the presence of stated features, ranges, integers, steps, operations, elements and/or components, but does not preclude the presence or addition of other features, ranges, integers, steps, operations, elements and/or components.

Further, as used herein, fibers refer to including both a filament which is a long fiber, and a staple which is a short fiber.

According to one embodiment of the present invention, there is provided a polyester fiber formed from a polyester resin polymerized with a dicarboxylic acid including terephthalic acid or a derivative thereof and a diol including isosorbide, thereby having an alternating structure of an acid moiety derived from the dicarboxylic acid or a derivative thereof and a diol moiety derived from the diol, wherein the polyester resin includes 1 to 20 mol % of a diol moiety derived from isosorbide and 2 to 5 mol % of a diol moiety derived from diethylene glycol based on the total diol moieties derived from the diol, and wherein the polyester resin has an oligomer content of 1.3% by weight or less, and a haze of less than 3% as measured according to ASTM D1003-97 for a specimen having a thickness of 6 mm obtained from the polyester resin.

The present inventors have conducted extensive and intensive studies to develop synthetic fibers for providing fishing guts and fishing nets requiring a high specific gravity and saline water resistance, and pelt for paper machines requiring alkali resistance, and as a result, they found that it is possible to adjust the physical properties of undrawn fiber and ultimately provide a molded article having desired physical properties, thereby completing the present invention.

Specifically, the inventors have found that when a polyester fiber is formed from a polyester resin having a specific content of isosorbide introduced therein and having a low oligomer content, it is possible to provide a molded article which exhibits a high specific gravity and excellent mechanical properties, and also has excellent saline water resistance, chemical resistance (alkali resistance), light resistance, dyeing properties and high transparency.

In the case of PET which is represented by a polyester resin, the regularity of the polymer chain is high and a haze is easily generated due to a fast crystallization rate, and thus its use in applications requiring high transparency has been limited. In particular, when a conventional polyester resin is formed to have a large thickness, a haze is easily generated, and thus, its use in applications requiring high transparency has been limited.

In order to solve these problems, a method of introducing isosorbide into the backbone of conventional polymers has been introduced. However, residues derived from isosorbide deteriorated the regularity of the polymer chain, which in turn deteriorated the crystallization rate of the resin. In order to ensure sufficient transparency, the polyester resin should contain a large amount of diol moieties derived from isosorbide, but this caused a problem that the polyester resin could not function as a crystalline resin due to the large amount of diol moieties derived from isosorbide. In addition, non-crystalline resins have low regularity of the molecular structure and so cannot be formed by drawing. Due to these problems, there was a limitation on the content of isosorbide that can be introduced into the polymer backbone.

Regardless of these limitations, the polyester fiber according to one embodiment of the present invention can be formed from a polyester resin including a diol moiety derived from isosorbide in an amount of 1 to 20 mol %, 3 to 20 mol %, 3 to 18 mol %, 5 to 20 mol %, 5 to 15 mol %, 9 to 20 mol %, 9 to 15 mol %, or 6 to 12 mol % based on the total diol moieties, thereby enhancing saline water resistance, chemical resistance, light resistance and dyeability and exhibiting excellent mechanical properties as well as excellent transparency.

More specifically, the polyester fiber according to one embodiment of the present invention may be formed from a polyester resin having a haze of less than 3%, less than 2.5%, less than 2%, less than 1.5%, or less than 1.0% as measured according to ASTM D1003-97 when prepared with a specimen having a thickness of 6 mm. The polyester fiber according to one embodiment of the present invention may be formed from a polyester resin in which no haze is observed when prepared with a specimen having a thickness of 6 mm. Thus, the lower limit of the haze may be 0%.

In addition, the polyester resin forming the polyester fiber may have an intrinsic viscosity of 0.45 to 1.5 dl/g, 0.50 to 1.2 dl/g, 0.60 to 1.0 dl/g or 0.65 to 0.98 dl/g as measured at 35° C. after dissolving it in orthochlorophenol at a concentration of 1.2 g/dl at 150° C. for 15 minutes. If the intrinsic viscosity is less than the above range, defective appearance may occur during molding, sufficient mechanical strength may not be secured, and it may be difficult to exhibit a desired physical property by high drawing. Further, if the intrinsic viscosity exceeds the above range, the pressure of an extruder rises due to an increase in the viscosity of the melt during molding, and the spinning step may not be performed smoothly. In addition, if the temperature of the extruder is raised in order to address the rise in pressure, the physical properties may be deteriorated due to heat distortion, and the drawing tension may increase during the drawing step, which may cause a problem in the process.

Meanwhile, the polyester fiber may further comprise at least one additive selected from the group consisting of carbon black, a UV screening agent, an antistatic agent, an impact modifier, an antioxidant, and fine particles. The method of adding the additives is not particularly limited. For example, a method such as adding the additives at the time of preparing the polyester resin, or preparing a high-concentration master batch of the additive, followed by dilution and mixing, etc. can be used.

Hereinafter, a method for preparing such polyester fiber will be described in detail.

The polyester fiber may be prepared by the method comprising the steps of:
  (a) carrying out an esterification or a transesterification reaction of a dicarboxylic acid or a derivative thereof including terephthalic acid or a derivative thereof and a diol including 1 mol to 25 mol of isosorbide and 65 mol to 200 mol of ethylene glycol based on 100 mol of the total dicarboxylic acid or a derivative thereof;
  (b) subjecting the esterification reaction or transesterification reaction product to a polycondensation reaction to prepare a polyester resin polymerized with a dicarboxylic acid including terephthalic acid or a derivative thereof and a diol including isosorbide, thereby having an alternating structure of an acid moiety derived from the dicarboxylic acid or a derivative thereof and a diol moiety derived from the diol;
  (c) melt-spinning the polyester resin obtained in step (b) at 240° C. to 310° C.; and
  (d) drawing the melt-spun undrawn fiber obtained in step (c) at a temperature equal to or higher than the glass transition temperature of the polyester resin.

In step (b) of the preparation method, the polycondensation reaction can be carried out so that an intrinsic viscosity, which is measured at 35° C. after dissolving the polycondensation reaction product in orthochlorophenol at a concentration of 1.2 g/dl at 150° C. for 15 minutes, reaches 0.45 dl/g to 0.75 dl/g, and the subsequent steps thereof may be carried out.

Further, in the step (c), the polyester resin can be melt-spun at a relatively low temperature to minimize the thermal decomposition of the polymer and maintain the long chain structure of the polymer. Specifically, the step (c) may be carried out at a temperature of 240° C. to 310° C. or 250° C. to 300° C. When the melt spinning temperature is lower than 240° C., there is a problem that the polymer is not melted, and when the temperature is higher than 310° C., the thermal decomposition of the polymer increases and so the fiber easily breaks during molding of the fiber, and thus the desired physical properties may not be expressed, and the surface damage of a raw fiber may lead to deterioration of the overall physical properties.

The melt-spun undrawn fiber obtained in step (c) may be cooled to a temperature equal to or lower than the glass transition temperature of the polyester resin used. Thereafter, the undrawn fiber may be drawn at a temperature equal to or higher than the glass transition temperature of the polyester resin. Specifically, the drawing step of the undrawn fiber may be carried out at a temperature of 80° C. to 220° C. or 90° C. to 210° C. In the step (c), the undrawn fiber may be drawn at a high magnification. Specifically, the undrawn fiber may be drawn at a draw ratio of 3 times or more or 4 times or more.

In the method for preparing the polyester fiber, the polyester resin may be prepared through the esterification reaction (a) or transesterification; and the polycondensation reaction (b).

Herein, the polyester resin may be prepared in a batch process, a semi-continuous process or a continuous process, and the esterification reaction or transesterification reaction and the polycondensation reaction are preferably carried out under an inert gas atmosphere, the mixing of the polyester resin with other additives may be simple mixing or mixing by extrusion.

In addition, if necessary, a solid phase polymerization reaction may proceed in succession. Specifically, the method for preparing the polyester resin according to one embodiment of the present invention may further include, after step (b) and before step (c), (b0-1) a step of crystallizing the polymer prepared by polycondensation reaction (melt polymerization); and (b0-2) a step of subjecting the crystallized polymer to a solid phase polymerization such that the intrinsic viscosity, which is measured at 35° C. after dissolving the polymer in orthochlorophenol at a concentration of 1.2 g/dl at 150° C. for 15 minutes, reaches a value of 0.05 to 0.40 dl/g higher than the intrinsic viscosity of the resin obtained in step (b).

As used herein, the term "dicarboxylic acid or a derivative thereof" means at least one compound selected from dicarboxylic acid and a derivative of dicarboxylic acid. The term "derivative of dicarboxylic acid" means an alkyl ester of dicarboxylic acid (lower alkyl ester having 1 to 4 carbon atoms such as monomethyl, monoethyl, dimethyl, diethyl or dibutyl ester, etc.) or an anhydride of dicarboxylic acid. Thus, for example, terephthalic acid or a derivative thereof is collectively referred to as terephthalic acid; monoalkyl or dialkyl terephthalate; and compounds of forming a terephthaloyl moiety by reaction with diols, such as terephthalic acid anhydride.

As the (i) dicarboxylic acid or derivatives thereof, terephthalic acid or a derivative thereof is mainly used. Specifically, terephthalic acid or a derivative thereof may be used alone as the (i) dicarboxylic acid or derivatives thereof. Further, the (i) dicarboxylic acid or derivatives thereof may be used in the form of a mixture of terephthalic acid or a derivative thereof; and at least one selected from the group consisting of an aromatic dicarboxylic acid having 8 to 14 carbon atoms or a derivative thereof and an aliphatic dicarboxylic acid having 4 to 12 carbon atoms or a derivative thereof, which is a dicarboxylic acid or a derivative thereof other than the terephthalic acid or a derivative thereof. The aromatic dicarboxylic acid having 8 to 14 carbon atoms or a derivative thereof may include an aromatic dicarboxylic acid or a derivative thereof commonly used in the preparation of polyester resins, for example, naphthalene dicarboxylic acid such as isophthalic acid, dimethyl isophthalate, phthalic acid, dimethyl phthalate, phthalic anhydride, 2,6-naphthalene dicarboxylic acid or the like, dialkyl naphthalene dicarboxylate such as dimethyl 2,6-naphthalene dicarboxylate, or the like, diphenyldicarboxylic acid, and the like. The aliphatic dicarboxylic acid having 4 to 12 carbon atoms or a derivative thereof may include a linear, branched or cyclic aliphatic dicarboxylic acid or a derivative thereof conventionally used in the preparation of polyester resins, for example, cyclohexanedicarboxylic acid such as 1,4-cyclohexanedicarboxylic acid, 1,3-cyclohexanedicarboxylic acid, or the like, cyclohexanedicarboxylate such as dimethyl 1,4-cyclohexanedicarboxylate, dimethyl 1,3-cyclohexanedicarboxylate or the like, sebacic acid, succinic acid, isodecyl succinic acid, maleic acid, maleic anhydride, fumaric acid, adipic acid, glutaric acid, azelaic acid, and the like.

The (i) dicarboxylic acid or a derivative thereof may include terephthalic acid or a derivative thereof in an amount of 50 mol % or more, 60 mol % or more, 70 mol % or more, 80 mol % or more, or 90 mol % or more based on the total (i) dicarboxylic acids or derivatives thereof. The (i) dicarboxylic acid or a derivative thereof may include a dicarboxylic acid or a derivative thereof other than terephthalic acid or a derivative thereof in an amount of 0 to 50 mol %, greater than 0 mol % and 50 mol % or less, or 0.1 to 40 mol % based on the total (i) dicarboxylic acids or derivatives thereof. Within such a content range, the polyester resin realizing appropriate physical properties can be prepared.

Meanwhile, the isosorbide (1,4:3,6-dianhydroglucitol) is used such that the diel moiety derived from isosorbide is 1 to 20 mol % or 6 to 12 mol based on the total diol moieties derived from the diol of the polyester resin prepared.

A part of isosorbide may be volatilized or not reacted during the synthesis of the polyester resin. Therefore, in order to introduce the above-mentioned content of isosorbide into the polyester resin, the isosorbide may be used in an amount of 1 mol to 25 mol, or 6.5 mol to 25 mol based on 100 mol of the total dicarboxylic acids or derivatives thereof.

If the content of isosorbide exceeds the above range, a yellowing phenomenon may generate, and crystallinity may be significantly reduced, which may be disadvantageous for the drawing step. If the content is less than the above range, sufficient saline water resistance, chemical resistance and mechanical strength may not be exhibited, and a haze may generate. However, when the content of isosorbide is adjusted within the above-mentioned range to prepare into a specimen having a thickness of 6 mm, the polyester resin exhibiting high transparency can be provided, and thereby a polyester fiber having excellent saline water resistance, chemical resistance, light resistance and transparency can be provided.

The content of the diol moiety derived from diethylene glycol introduced into the polyester resin is not directly proportional to the content of ethylene glycol used for the preparation of the polyester resin. However, ethylene glycol may be used in an amount of 65 mol to 200 mol or 80 mol to 200 mol based on 100 mol of the total dicarboxylic acids or derivatives thereof so that the diol moiety derived from diethylene glycol is 2 to 5 mol % based on the total diol moieties derived from the diol of the polyester resin.

If the content of the diol moiety derived from diethylene glycol introduced into the polyester resin exceeds the above range, it may not exhibit sufficient heat resistance, and if the content is less than the above range, a haze may generate. In contrast, if the content of the diol moiety derived from diethylene glycol is less than the above range, the mechanical properties may not be sufficient.

The polyester resin may include the diol moieties derived from isosorbide and diethylene glycol as described above and diol moieties derived from residual aliphatic diols based on the total diol moieties. The aliphatic diol may be an aliphatic diol having 2 to 12 carbon atoms. Specific examples of the aliphatic diol include a linear, branched or cyclic aliphatic diol such as triethylene glycol, propanediol (1,2-propanediol, 1,3-propanediol or the like), 1,4-butanediol, pentanediol, hexanediol (1,6-hexanediol, or the like), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol or the like. As the diol, the above-listed diols other than the isosorbide can be included alone or in combination of two or more thereof. For example, ethylene glycol, 1,4-cyclohexanedimethanol, or the like may be added alone or in combination of two or more thereof to the isosorbide. In the diol, the diol other than isosorbide may be ethylene glycol, and the content of diol used for improving the physical properties in addition to isosorbide and ethylene glycol may be adjusted, for example, to 0 to 50 mol % or 0.1 to 30 mol %, based on the total diols.

Meanwhile, in order to prepare the polyester resin, the dicarboxylic acid or a derivative thereof and (ii) the diol may be added to a reactor so that the molar ratio between the dicarboxylic acid or a derivative thereof and the diol is 1.01 or more. In addition, the diol may be supplied to the reactor at one time before the polymerization reaction or may be added during the polymerization reaction several times, if necessary.

According to a more specific embodiment, the polyester resin satisfying a specific molecular weight distribution may be prepared by adjusting the initial input amount of the dicarboxylic acid or a derivative thereof and the diol in the initial stage of a reaction. Thereby, the polyester fiber of one embodiment and the polyester resin contained therein can be more effectively obtained.

In one example, when a dicarboxylic acid is used as the dicarboxylic acid or a derivative thereof, the initial mixing molar ratio between the dicarboxylic acid or a derivative thereof and the diol may be adjusted to 1:1.01 to 1.05, and when a derivative such as a dicarboxylic acid alkyl ester or a dicarboxylic acid anhydride is used as the dicarboxylic acid or a derivative thereof, the initial mixing molar ratio between the dicarboxylic acid or a derivative and the diol may be adjusted to 1:2.0 to 1:2.1.

The initial mixing molar ratio may refer to a mixing molar ratio at the start of the polymerization reaction in the reactor, and a dicarboxylic acid or a derivative and/or a diol may be further added during the reaction if necessary.

Meanwhile, a catalyst may be used in the (a) esterification reaction or transesterification reaction. Examples of the catalyst include a methylate of sodium and magnesium; an acetate, a borate, a fatty acid salt, a carbonate, and an alkoxy salt of Zn, Cd, Mn, Co, Ca, Ba, Ti or the like; metal Mg; an oxide of Pb, Zn, Sb, Ge, or the like.

The (a) esterification reaction or the transesterification reaction may be carried out as a batch process, a semi-continuous process or a continuous process, and each raw material may be added separately, but it may be preferably added in the form of a slurry in which the dicarboxylic acid or a derivative thereof is mixed to the diol.

A polycondensation catalyst, a stabilizer, a coloring agent, a crystallizing agent, an antioxidant, a branching agent and the like may be added to the slurry before the start of the (a) esterification reaction or the transesterification reaction, or to the product after the completion of the reaction.

However, the timing of adding the above-described additives is not limited thereto, and they may be added at any time point during the preparation of the polyester resin. As the polycondensation catalyst, at least one of conventional titanium-based catalyst, germanium-based catalyst, antimony-based catalyst, aluminum-based catalyst, tin-based catalyst, or the like may be appropriately selected and used. Examples of the useful titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide copolymer, titanium dioxide/zirconium dioxide copolymer or the like. Further, examples of the useful germanium-based catalyst include germanium dioxide and a copolymer thereof. The added amount of the polycondensation catalyst may be adjusted in the range of 1 ppm to 300 ppm relative to the weight of the final polymer (polyester resin) based on the central metal atom.

As the stabilizer, generally, a phosphor-based stabilizer such as phosphoric acid, trimethyl phosphate, triethyl phosphate, or the like may be used, and the added amount thereof may be in the range of 10 ppm to 5000 ppm relative to the weight of the final polymer (polyester resin) based on the phosphorus atom. If the added amount of the stabilizer is less than 10 ppm, the polyester resin may not be sufficiently stabilized and the color of the polyester resin may become yellow. If the added amount exceeds 5000 ppm, a desired polymer having a high degree of polymerization may not be obtained. Examples of the coloring agent added for improving the color of the polymer include a cobalt-based decoloring agent such as cobalt acetate, cobalt propionate or the like, and the added amount thereof is 1 to 300 ppm relative to the weight of the final polymer (polyester resin) based on the cobalt atom. If necessary, as an organic coloring agent, an anthraquionone-based compound, a perinone-based compound, an azo-based compound, a methine-based compound and the like may be used. Commercially available products include a toner such as Polysynthrene Blue RLS manufactured by Clarient or Solvaperm Red BB manufactured by Clarient. The added amount of the organic coloring agent may be adjusted in the range of 0 to 50 ppm relative to the weight of the final polymer. If the coloring agent is used in an amount outside the above range, the yellow color of the polyester resin may not be sufficiently concealed or the physical properties may be deteriorated.

Examples of the crystallizing agent include a crystal nucleating agent, a UV absorber, a polyolefin-based resin, a polyamide resin or the like. Examples of the antioxidant include a hindered phenol-based antioxidant, a phosphite-based antioxidant, a thioether-based antioxidant, or a mixture thereof. As the branching agent, for example, trimellitic anhydride, trimethylol propane, trimellitic acid or a mixture thereof may be used as a conventional branching agent having three or more functional groups.

The (a) esterification reaction or the transesterification reaction may be carried out at a temperature of 150 to 300° C. or 200 to 270° C. under a pressure condition of 0 to 10.0 kgf/cm2 (0 to 7355.6 mmHg), 0 to 5.0 kgf/cm2 (0 to 3677.8 mmHg) or 0.1 to 3.0 kgf/cm2 (73.6 to 2206.7 mmHg). Here, the pressure stated in the outside of the parenthesis refers to a gauge pressure (expressed in kgf/cm2); and the pressure stated in the parenthesis refers to an absolute pressure (expressed in mmHg).

If the reaction temperature and pressure deviate from the above range, the physical properties of the polyester resin may be deteriorated. The reaction time (average retention time) is usually 1 to 24 hours or 2 to 8 hours, and may vary depending on the reaction temperature, the pressure, and the molar ratio of the dicarboxylic acid or a derivative thereof to the diol used.

The product obtained by the esterification reaction or the transesterification reaction may be prepared into a polyester resin having a higher degree of polymerization by polycondensation reaction. Generally, the polycondensation reaction is carried out at a temperature of 150 to 300° C., 200 to 290° C. or 250 to 290° C. under a reduced pressure of 0.01 to 400 mmHg, 0.05 to 100 mmHg or 0.1 to 10 mmHg. Herein, the pressure refers to the range of absolute pressures. The reduced pressure of 0.01 mmHg to 400 mmHg is used to remove glycol as a by-product of the polycondensation reaction, and isosorbide as an unreacted material, etc. Thus, if the reduced pressure condition deviates from the above range, the by-products and unreacted materials may not be sufficiently removed. Moreover, if the temperature of the polycondensation reaction deviates from the above range, the physical properties of the polyester resin may be deteriorated. The polycondensation reaction is carried out for a period of time required to reach a desirable intrinsic viscosity, for example, it may be carried out for an average retention time of 1 hours to 24 hours.

For the purpose of reducing the amount of unreacted materials such as isosorbide remaining in the polyester resin, it is possible to intentionally increase the vacuum reaction at the last stage of the esterification reaction or transesterification reaction or at the initial stage of the polycondensation reaction, that is, at a state in which the viscosity of the resin is not sufficiently high, thereby discharging the unreacted raw materials out of the system. When the viscosity of the resin is increased, it may be difficult for raw materials remaining in the reactor to escape out of the system. In one example, before the polycondensation reaction, the reaction product obtained by the esterification reaction or the transesterification reaction is allowed to stand at a reduced pressure condition of about 400 to 1 mmHg or about 200 to 3 mmHg for 0.2 to 3 hours to effectively remove unreacted materials such as isosorbide remaining in the polyester resin. Herein, the temperature of the product may be controlled to a temperature equal to the temperature of the esterification reaction or transesterification reaction and of the polycondensation reaction, or to a temperature therebetween.

As the process of flowing out the unreacted raw materials through the control of the vacuum reaction is further added, the amount of unreacted materials such as isosorbide remaining in the polyester resin can be reduced, and consequently, the polyester fiber satisfying the physical properties of one embodiment and the polyester resin included therein can be more effectively obtained.

Meanwhile, as already described above, the intrinsic viscosity of the polymer after the polycondensation reaction is appropriately in the range of 0.45 dl/g to 0.75 dl/g.

In particular, if the crystallization step (b0-1) and the solid phase polymerization step (b0-2) described above are employed, the intrinsic viscosity of the polymer after the polycondensation reaction can be adjusted to 0.45 to 0.75 dl/g, 0.45 to 0.70 dl/g or 0.50 to 0.70 dl/g. If the intrinsic viscosity after the polycondensation reaction is less than 0.45 dl/g, the reaction speed in the solid phase polymerization reaction is significantly reduced, and a polyester resin having a very high molecular weight distribution is obtained. If the intrinsic viscosity exceeds 0.75 dl/g, as the viscosity of the melt increases during the melt polymerization, the possibility of discoloration of the polymer is increased due to the shear stress between the stirrer and the reactor, and side reaction materials such as acetaldehyde are also increased. Meanwhile, when the polycondensation reaction is carried out so as to have a high intrinsic viscosity, which is then introduced into the solid phase polymerization stage, a polyester resin having a uniform molecular weight distribution can be obtained, thereby further improving the chemical resistance and transparency.

Meanwhile, if the crystallization step (b0-1) and the solid phase polymerization step (b0-2) described above are not employed, the intrinsic viscosity of the polymer after the polycondensation reaction may be adjusted to 0.65 to 0.75 dl/g. If the intrinsic viscosity is less than 0.65 dl/g, the crystallization rate increases due to the low molecular weight polymer, and so it may be difficult to provide a polyester resin having excellent heat resistance and transparency. If the intrinsic viscosity exceeds 0.75 dl/g, as the viscosity of the melt increases during the melt polymerization, the possibility of discoloration of the polymer is increased due to the shear stress between the stirrer and the reactor, and side reaction materials such as acetaldehyde are also increased.

A polyester resin capable of forming the polyester fiber according to one embodiment can be produced through the steps (a) and (b). If necessary, the crystallization step (b0-1) and the solid phase polymerization step (b0-2) may be further carried out after the (b) polycondensation reaction to provide a polyester resin having a higher degree of polymerization.

Specifically, in the crystallization step (b0-1), the polymer obtained by the polycondensation reaction (b) is discharged out of the reactor to be granulated. As the granulation method, a strand cutting method of extruding into a strand type, solidifying in a cooling liquid and then cutting with a cutter, or an underwater cutting method of immersing a die hole in a cooling liquid, directly extruding in a cooling liquid and then cutting with a cutter can be used. Generally, in the strand cutting method, the cooling liquid is maintained at a low temperature to enable the solidification of the strand, thereby preventing cutting problems. In the underwater cutting method, it is preferred that the temperature of the cooling liquid is maintained in accordance with the polymer so that the shape of the polymer becomes uniform. However, in the case of a crystalline polymer, the temperature of the cooling liquid may be intentionally maintained at a high level in order to induce crystallization during discharge.

Meanwhile, it is also possible to additionally wash the granulated polymer with water. The temperature of water during washing is preferably equal to or lower by about 5 to 20° C. than the glass transition temperature of the polymer, and fusion may occur at a higher temperature, which is not preferable. In the case of polymer particles that induce the crystallization during discharge, fusion does not occur at a temperature higher than the glass transition temperature, and thus, the temperature of water may be set according to the degree of crystallization. Through washing of the granulated polymer, the raw materials dissolved in water among the unreacted raw materials can be removed. As the particle size decreases, the surface area relative to the weight of the particles increases, and thus, a smaller particle size is preferred. In order to achieve such purpose, the particles may be prepared to have an average weight of about 14 mg or less.

The granulated polymer undergoes the crystallization step to prevent fusion during the solid phase polymerization. The crystallization may be carried out under the atmosphere, inert gas, water vapor, vapor-containing inert gas atmosphere or in a solution at 110° C. to 180° C. or 120° C. to 180° C. If the temperature is low, the rate at which the crystals of the particles are formed is too slow. If the temperature is high, the particles are melted at a faster rate than the rate at which the crystals are formed, making the particles to stick together, thereby causing fusion to occur. Since the heat resistance of the particles increases as the particles are crystallized, it is also possible to carry out the crystallization by dividing it into several steps and raising the temperature stepwise.

The solid phase polymerization reaction may be carried out under an inert gas atmosphere such as nitrogen, carbon dioxide, argon or the like, or under a reduced pressure condition of 400 to 0.01 mmHg at a temperature of 180° C. to 220° C. for an average retention time of 1 hour or more, preferably 10 hours or more. This solid phase polymerization further increases the molecular weight, and the raw materials, which remain unreacted in the melting reaction, and cyclic oligomers, acetaldehydes and the like generated during the reaction may be removed.

In order to provide the polyester resin according to one embodiment, the solid phase polymerization may be carried out until the intrinsic viscosity reaches a value of 0.05 dl/g to 0.40 dl/g higher than the intrinsic viscosity of the resin obtained in the polycondensation reaction step (b). If the difference between the intrinsic viscosity of the resin after the solid phase polymerization reaction and the intrinsic viscosity of the resin before the solid phase polymerization is less than 0.05 dl/g, a sufficient degree of polymerization improving effect cannot be obtained. If the difference between the intrinsic viscosity of the resin after the solid phase polymerization and the intrinsic viscosity of the resin before the solid phase polymerization exceeds 0.40 dl/g, the molecular weight distribution becomes wide and so a sufficient heat resistance cannot be exhibited, and further the content of the oligomer is relatively increased and so the possibility of generation of a haze is increased.

The solid phase polymerization is carried out in such a manner that the intrinsic viscosity of the resin is 0.05 to 0.40 dl/g higher than the intrinsic viscosity of the resin before the solid phase polymerization and until the intrinsic viscosity reaches a value of 0.70 dl/g or more, 0.70 to 1.0 dl/g, or 0.70 to 0.98 dl/g. When the solid phase polymerization is continued until it reaches the intrinsic viscosity within such range, the molecular weight distribution of the polymer becomes narrower, thereby decreasing the crystallization rate during molding. Accordingly, the heat resistance and the degree of crystallinity can be improved without deteriorating the transparency. If the intrinsic viscosity of the resin after the solid phase polymerization reaction is less than the above range, it may be difficult to provide a polyester fiber having excellent transparency due to an increase in the crystallization rate by the oligomers having a low molecular weight.

The polyester resin prepared by the above method has an alternating structure of an acid moiety derived from a dicarboxylic acid or a derivative thereof and a diol moiety derived from a diol. In the specification, the acid moiety and the diol moiety refer to a residue remaining after the dicarboxylic acid or a derivative thereof and the diol are polymerized and hydrogen, hydroxyl or alkoxy groups are removed therefrom.

In particular, the polyester resin is prepared according to the method described above and has features that a diol moiety derived from isosorbide is 1 to 20 mol % and a diol moiety derived from diethylene glycol is 2 to 5 mol %, based on the total diol moieties derived from the diol, an oligomer content of the polyester resin is 1.3% by weight or less, and a haze is less than 3% as measured according to ASTM D1003-97 for a specimen having a thickness of 6 mm obtained from the polyester resin. Accordingly, the polyester fiber formed from the polyester resin can exhibit excellent saline water resistance, chemical resistance, light resistance and dyeability and can exhibit improved mechanical strength and transparency as described above.

The polyester resin mainly has an alternating structure of an acid moiety derived from a dicarboxylic acid or a derivative thereof and a diol moiety derived from a diol, but it may include a structure in which the diols react with other diols due to side reactions and so diol moieties derived from the diol are connected to each other. However, according to the method described above, such side reactions can be remarkably reduced. In an example, the residue derived from diethylene glycol may be contained in an amount described above based on the residue derived from the total diols in the polyester resin. The polyester resin contains the residues derived from diethylene glycol within such a range and thus may exhibit a sufficient glass transition temperature.

The polyester resin forming the polyester fiber may have a number average molecular weight (Mn) of about 12,000 to 50,000 g/mol or about 15,000 to 40,000 g/mol. The polyester resin may have a weight average molecular weight (Mw) of 45,000 to 250,000 g/mol or 50,000 to 225,000 g/mol. Further, the molecular weight distribution (PDI) of the polyester resin may be in the range of 2.5 to 4.5 or 2.8 to 4.0.

If the weight average molecular weight is less than the above range, the mechanical properties, for example, tensile strength, knot strength or the like may be deteriorated. If the weight average molecular weight exceeds the above range, processability may deteriorate as the melting point increases, and the spinning step may not perform smoothly due to an increase in pressure during spinning.

The polyester resin may have a glass transition temperature (Tg) of 82° C. to 105° C. Within such a range, various physical properties of the polyester resin can be favorably exhibited without a yellowing phenomenon.

The polyester resin may or may not have a crystallization temperature (Tc) and a melting point (Tm) in accordance with a differential scanning calorimetry (DSC) measurement condition. The polyester resin having a glass transition temperature (Tg) ranging from 82° C. to 90° C. may have a crystallization temperature (Tc) of 120° C. to 200° C. or 130° C. to 190° C. In the polyester resin having a glass transition temperature (Tg) of 90° C. to 105° C. or 92° C. to 105° C., the crystallization temperature (Tc) is not measured, or it may be in the range of about 130° C. to 190° C. or 140° C. to 180° C. Within the range, the polyester resin has an appropriate crystallization rate and thus can enable the solid phase polymerization reaction and exhibit high transparency after molding.

The polyester fiber according to one embodiment of the present invention may be formed from the polyester resin described above and may have a density of 1.3 to 1.4 g/m3 as measured at 23° C. Accordingly, the polyester fiber may exhibit a specific gravity of about 1.3 or more, which is higher than that of seawater, and thus, fishing guts or fishing nets prepared therefrom can naturally sink in the water, thereby satisfying the needs of the industry.

The polyester fiber may exhibit a tensile strength of 3.0 g/d or more, 3.0 to 5.0 g/d, or 3.2 to 4.5 g/d. In addition, the polyester fiber may exhibit an elongation of 14% or more, 14% to 50%, or 15% to 50%. Accordingly, a molded article prepared from the polyester fiber can exhibit sufficient toughness and appropriate modulus.

The polyester fiber may have a knot strength of 2.0 g/d or more, 2.0 to 4.0 g/d, or 2.1 to 4.0 g/d, as measured by an over hand knot method. The polyester fiber may have a knot strength retention rate of 40% or more, 40% to 80%, 50% to 80%, 60% to 80%, 65% to 80% 65% to 75% or 68% to 75%, which is calculated as a percentage of the knot strength relative to the tensile strength.

As described above, the polyester fiber according to one embodiment of the present invention exhibits excellent saline water resistance, chemical resistance, light resistance and dyeability, and has improved mechanical strength and transparency and thus can be utilized in various fields. In particular, it is expected to be useful for applications in fishing guts and fishing nets requiring a high specific gravity and high saline water resistance and in pelt for paper machines requiring high chemical resistance (alkali resistance). In addition, the polyester fiber is expected to be useful for application in ropes, gut for rackets, carpets, rugs, mats and clothes due to the excellent properties described above. Moreover, the polyester fiber takes the form of a polyester filament fiber having a diameter of 4 mm or less and thus is expected to be useful for application in 3D printers.

Meanwhile, according to anther embodiment of the present invention, there is provided a molded article prepared from the polyester fiber. The molded article may be a molded product for fishing guts, fishing nets, pelt, ropes, gut for rackets, carpets, rugs, mats, clothes or 3D printers, etc.

Hereinafter, the action and effect of the present invention will be described by way of specific Examples. However, these Examples are given for illustrative purposes only, and they are not intended to limit the scope of the invention in any manner.

The following physical properties were measured according to the methods below.

(1) Intrinsic Viscosity (IV)

The intrinsic viscosity of the specimen was measured using a Ubbelohde viscometer after dissolving the specimen in orthochlorophenol (OCP) at a concentration of 1.2 g/dl at 150° C. for 15 minutes. Specifically, the temperature of the viscometer was maintained at 35° C. and the time (efflux time) t0 required for a solvent to pass between the specific internal sections of the viscometer and the time t required for a solution to pass therebetween were determined. Thereafter, the value of t0 and the value of t were substituted into Equation 1 to calculate a specific viscosity, and the calculated specific viscosity value was substituted into Equation 2 to calculate an intrinsic viscosity.

$$\eta_{sp} = \frac{t - t_0}{t_0} \quad \text{[Equation 1]}$$

$$[\eta] = \frac{\sqrt{1 + 4A\eta_{sp}} - 1}{2Ac} \quad \text{[Equation 2]}$$

in Equation 2, A represents the Huggins constant, which was 0.247, and c represents a concentration value, which was 1.2 g/dl.

(2) Glass Transition Temperature (Tg)

The Tg of the polyester resins prepared in Examples and Comparative Examples was measured by DSC (differential scanning calorimetry). DSC 1 model manufactured by Mettler Toledo was used as the measuring device. Specifically, the polyester resin sample used for the analysis was dried for 5 to 10 hours under a nitrogen atmosphere at 120° C. using a dehumidifying dryer (model name: D2T manufactured by Moretto). Thus, the Tg was measured in a state in which the amount of water remaining in the sample was less than 500 ppm. About 6 to 10 mg of the dried sample was taken and filled into an aluminum pan. Then, the sample was heated from room temperature to 280° C. at a rate of 10° C./min (first scan) and annealed at 280° C. for 3 minutes. After the sample was rapidly cooled to room temperature, the sample was again heated from room temperature to 280° C. at a rate of 10° C./min to obtain a DSC curve (second scan). Then, the Tg value in the DSC second scan was analyzed through the glass transition function in the DSC menu of the related program (STARe Software) provided by Mettler Toledo. Herein, the Tg is defined as the temperature at which the maximum slope of the curve appears at the point where the DSC curve obtained during the second scan changes to a stair shape for the first time during the temperature rising process. The temperature range of the scan was set from −20° C.-15° C. to 15° C.-20° C. of the midpoint calculated from the program.

(3) Thickness of Fiber

The long and short diameters of the polyester fibers and nylon 6 fibers prepared in Examples and Comparative Examples were measured using an optical microscope and expressed as an average value.

(4) Oligomer Content 0.3 g of the sample of the polyester fibers and nylon 6 fibers prepared in Examples and Comparative Examples was each dissolved in 15 mL of o-chlorophenol at 150° C. for 15 minutes, and then 9 mL of chloroform was added thereto at room temperature. GPC was a product of Tosoh, and the molecular weight of the sample was measured using an RI detector. The oligomer content was measured by determining the area of molecular weight of 1000 or less in the total area.

(5) Density (Measured at 23° C.)

The density of the polyester fibers and nylon 6 fibers prepared in Examples and Comparative Examples were measured at 23° C. using a gradient density column. Two solutions having different densities were sequentially mixed and put into a graduated glass tube so that a certain range of densities could be measured, and then glass beads, the density of which was confirmed after preparation, were floated to prepare a calibration curve. The measured specimens were submerged in the gradient density column, and the height of the glass beads floated was measured, then the density was calculated proportionally based on the calibration curve.

(6) Elongation

The elongation of the polyester fibers and nylon 6 fibers prepared in Examples and Comparative Examples were measured at a rate of 200 mm/min using the UTM universal testing machine model Z011 manufactured by Zwick/Roell when the specimen was cut.

(7) Tensile Strength

The tensile strength of the polyester fibers and nylon 6 fibers prepared in Examples and Comparative Examples were determined at a rate of 200 mm/min using the UTM universal testing machine model Z011 manufactured by Zwick/Roell by dividing cutting force (kgf) by fineness.

(8) Knot Strength

The strength at break of the polyester fibers and nylon 6 fibers prepared in Examples and Comparative Examples was measured in the same manner as in the tensile strength after making a knot at the center of the fiber.

(9) Knot Strength Retention Rate

The knot strength retention rate was evaluated as a percentage of the knot strength relative to the tensile strength.

Knot strength retention rate(%)=knot strength/tensile strength*100

(10) Saline Water Resistance

The polyester fibers and nylon 6 fibers prepared in Examples and Comparative Examples were each placed in a 10% NaCl solution and immersed at room temperature for 120 hours, and then the force was measured using the UTM Instron. The saline water resistance was evaluated by the ratio of the post-immersion force to the pre-immersion force (initial force) (post-immersion force/initial force*100).

(11) Chemical Resistance

The polyester fibers and nylon 6 fibers prepared in Examples and Comparative Examples were each placed in a 20% NaOH solution or a 20% KOH solution and immersed at room temperature for 120 hours, and then the force was measured using the UTM Instron. The chemical resistance against NaOH and the chemical resistance against KOH were evaluated by the ratio of the post-immersion force to the pre-immersion force (initial force) (post-immersion force/initial force*100).

(12) Light Resistance

The polyester fibers and nylon 6 fibers prepared in Examples and Comparative Examples were each exposed to UV rays (340 nm, 0.55 W/m2) for 50 hours at 50° C., and then the force was measured using the UTM Instron. The light resistance was evaluated by the ratio of post-exposure force to pre-exposure force (initial force) (post-exposure force/initial force*100)

(13) Haze

Specimens having the same thickness as the fibers of Examples and Comparative Examples were prepared using the polyester resins and nylon 6 resins prepared in Examples and Comparative Examples, and the haze of the specimens was measured using a CM-3600A measuring device (Minolta) according to ASTM D1003-97 test method.

(14) Absorption Rate 10 g of fiber was collected from each of the polyester fibers and nylon 6 fibers prepared in Examples and Comparative Examples, immersed in distilled water for 24 hours, allowed to stand at room temperature, and dried in an oven at 105° C. to 110° C. until there was no change in weight. The absorption rate was calculated by Equation below by measuring the weight of the fiber (fiber prior to drying) allowed to stand at room temperature for 24 hours and the weight of the dried fibers.

Absorption rate(%)=(Weight of fiber before drying−weight of dried fiber)/weight of dried fiber*100

Example 1: Preparation of Polyester Resin and Polyester Fiber 3284 g (19.7 mol) of terephthalic acid, 1067 g (17.2 mol) of ethylene glycol, 347 g (2.3 mol) of isosorbide, and 42 g (0.4 mol) of diethylene glycol were added to a 10 L reactor equipped with a column and a water-cooled condenser. 1.0 g of GeO2 as a catalyst, 1.46 g of phosphoric acid as a stabilizer and 0.7 g of cobalt acetate as a coloring agent were used. Then, nitrogen was injected into the reactor to create a pressurized state in which the pressure of the reactor was higher than the atmospheric pressure by 1.0 kgf/cm2 (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 650 g of by-products were discharged through the column and the condenser.

When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised to 280° C. for 1 hour, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.61 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.98 dl/g.

The polyester resin thus prepared was melted at about 250° C. to 300° C., then spun and cooled. Then, it was drawn at a draw ratio of 4 times to prepare a polyester fiber having a thickness of Φ 3.5 mm.

Example 2: Preparation of Polyester Resin and Polyester Fiber 3284 g (19.8 mol) of terephthalic acid, 1065 g (18.7 mol) of ethylene glycol, 231 g (1.6 mol) of isosorbide, and 42 g (0.4 mol) of diethylene glycol were added to a 10 L reactor equipped with a column and a water-cooled condenser. 1.0 g of GeO2 as a catalyst, 1.46 g of phosphoric acid as a stabilizer and 0.7 g of cobalt acetate as a coloring agent were used. Then, nitrogen was injected into the reactor to create a pressurized state in which the pressure of the reactor was higher than the atmospheric pressure by 1.0 kgf/cm2 (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 700 g of by-products were discharged through the column and the condenser.

When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised to 280° C. for 1 hour at the same time, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.6 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.75 dl/g.

The polyester resin thus prepared was melted at about 250° C. to 300° C., then spun and cooled. Then, it was drawn at a draw ratio of 4 times to prepare a polyester fiber having a thickness of Φ 0.5 mm.

Example 3: Preparation of Polyester Resin and Polyester Fiber 3284 g (19.7 mol) of terephthalic acid, 1067 g (17.2 mol) of ethylene glycol, 347 g (2.3 mol) of isosorbide, and 63 g (0.6 mol) of diethylene glycol were added to a 10 L reactor equipped with a column and a water-cooled condenser. 1.0 g of GeO2 as a catalyst, 1.46 g of phosphoric acid as a stabilizer and 0.7 g of cobalt acetate as a coloring agent were used. Then, nitrogen was injected into the reactor to create a pressurized state in which the pressure of the reactor was higher than the atmospheric pressure by 1.0 kgf/cm2 (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, after confirming that 700 g of by-products were discharged through the column and the condenser, 221 g (3.5 mol) of ethylene glycol was further added to the reactor.

When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised to 280° C. for 1 hour at the same time, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.55 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The particles were allowed to stand at 150° C. for 1 hour and subjected to crystallization, and then added to a 20 L solid phase polymerization reactor. Thereafter, nitrogen was flowed into the reactor at a rate of 50 L/min. At this time, the temperature of the reactor was raised from room temperature to 140° C. at a rate of 40° C./hour, maintained at 140° C. for 3 hours, then raised to 200° C. at a rate of 40° C./hour and maintained at 200° C. The solid phase polymerization was carried out until the intrinsic viscosity (IV) of the particles in the reactor reached 0.98 dl/g.

The polyester resin thus prepared was melted at about 250° C. to 300° C., then spun and cooled. Then, it was drawn at a draw ratio of 4 times to prepare a polyester fiber having a thickness of Φ 0.5 mm.

Comparative Example 1: Preparation of Polyester Resin and Polyester Fiber

A polyamide fiber having a thickness of Φ 3.5 mm was prepared in the same manner as in Example 1 except that Nylon 5034MTX1 resin (marketed the company UBE) was used as a polyamide resin.

Comparative Example 2: Preparation of Polyester Resin and Polyester Fiber 2873 g (17.3 mol) of terephthalic acid, 1679 g (27.0 mol) of ethylene glycol, 329 g (2.3 mol) of isosorbide, and 37 g (0.3 mol) of diethylene glycol were added to a 10 L reactor equipped with a column and a water-cooled condenser. 1.0 g of GeO2 as a catalyst, 1.46 g of phosphoric acid as a stabilizer and 0.7 g of cobalt acetate as a coloring agent were used. Then, nitrogen was injected into the reactor to create a pressurized state in which the pressure of the reactor was higher than the atmospheric pressure by 1.0 kgf/cm2 (absolute pressure: 1495.6 mmHg).

Then, the temperature of the reactor was raised to 220° C. for 90 minutes, maintained at 220° C. for 2 hours, and then raised to 260° C. for 2 hours. Thereafter, the mixture in the reactor was observed with the naked eye, and the esterification reaction was carried out while maintaining the temperature of the reactor at 260° C. until the mixture became transparent. During this process, 750 g of by-products were discharged through the column and the condenser.

When the esterification reaction was completed, the pressure in the reactor was reduced to normal pressure by discharging nitrogen in the pressurized reactor to the outside. Then, the mixture in the reactor was transferred to a 7 L reactor capable of performing a vacuum reaction.

The pressure of the reactor was reduced to 5 Torr (absolute pressure: 5 mmHg) at normal pressure for 30 minutes, and simultaneously the temperature of the reactor was raised to 280° C. for 1 hour at the same time, and the polycondensation reaction was carried out while maintaining the pressure of the reactor at 1 Torr (absolute pressure: 1 mmHg) or less. The polycondensation reaction was carried out until the intrinsic viscosity (IV) of the mixture (melt) in the reactor reached 0.4 dl/g. When the intrinsic viscosity of the mixture in the reactor reached a desired level, the mixture was discharged to the outside of the reactor and stranded, then it was solidified with a cooling liquid and granulated so that the average weight was 12 to 14 mg.

The polyester resin thus prepared was melted at about 250° C. to 300° C., then spun and cooled. Then, it was drawn at a draw ratio of 4 times to prepare a polyester fiber having a thickness of Φ 1.0 mm.

Examples 4 to 6, Comparative Examples 3 and 4: Preparation of Polyester Resin and Polyester Fiber First, in Examples 4 to 6 and Comparative Example 3, the initial input molar ratio of the dicarboxylic acid or a derivative thereof to the diol was controlled in the same manner as in Example 1, and in Comparative Example 4, the initial input molar ratio of the dicarboxylic acid or derivative to the diol was controlled in the same manner as in Comparative Example 2.

In addition, the polyester resins and polyester fibers were prepared in the same manner as in Example 1 for rest of the conditions, except that by controlling the total amount of ethylene glycol, isosorbide and diethylene glycol, the amount of the diol moieties derived from isosorbide and diethylene glycol introduced into the polyester resin was controlled as shown in Table 1 below, and that the desired intrinsic viscosity for other polycondensation reactions and solid phase polymerization reactions and fiber thickness were adjusted as shown in Table 1.

Experimental Example: Evaluation of Polyester Fibers

The preparation conditions and physical properties of the polyester resins prepared in Examples 1 to 6 and Comparative Examples 1 to 4 were evaluated according to the methods described above, and the results are shown in Table 1.

TABLE 1

| | Examples | | | | | | Comparative Examples | | | |
| --- | --- | --- | --- | --- | --- | --- | --- | --- | --- | --- |
| | 1 | 2 | 3 | 4 | 5 | 6 | 1 | 2 | 3 | 4 |
| ISB content [mol %] | 9 | 5 | 9 | 9 | 15 | 20 | 0 | 9 | 0 | 35 |
| DEG content [mol %] | 2 | 2 | 3 | 2 | 3 | 5 | — | 1 | — | 5 |
| Intrinsic viscosity (polycondensation) [dl/g] | 0.61 | 0.6 | 0.55 | 0.45 | 0.70 | 0.65 | — | 0.40 | 0.70 | 0.75 |
| Intrinsic viscosity (solid-sate polymerization) [dl/g] | 0.98 | 0.75 | 0.98 | 0.85 | 0.75 | 0.70 | — | 0.40 | 1.00 | 0.75 |
| Tg [° C.] | 90 | 82.5 | 90 | 90 | 95 | 104 | 20 (50% RH) | 90 | 78 | 130 |
| Fiber thickness [diameter(Φ): mm] | 3.5 | 0.5 | 0.5 | 1.0 | 3.5 | 1.0 | 3.5 | 1.0 | 3.5 | 0.5 |
| Oligomer [wt %] | 0.5 | 0.7 | 0.5 | 0.6 | 0.7 | 0.9 | 6.1 | 1.4 | 1.6 | 0.9 |
| Density [g/m3] | 1.38 | 1.38 | 1.38 | 1.38 | 1.38 | 1.38 | 1.14 | 1.38 | 1.38 | 1.38 |
| Elongation [%] | 26 | 45 | 33 | 38 | 19 | 15 | 25 | 10 | 22 | — |
| Tensile strength [g/d] | 4.0 | 4.3 | 4.5 | 4.2 | 3.4 | 3.2 | 4.4 | 1.6 | 4.1 | — |
| Knot strength [g/d] | 2.9 | 3.0 | 3.3 | 3.2 | 2.3 | 2.1 | 1.8 | 0.3 | 2.3 | — |
| Knot strength retention rate [%] | 72 | 70 | 73 | 75 | 68 | 65 | 40 | 20 | 55 | — |
| Saline water resistance [%] | 102 | 99 | 100 | 100 | 100 | 105 | 68 | 40 | 99 | — |
| Chemical resistance (NaOH 20%) [%] | 90 | 87 | 89 | 90 | 91 | 91 | 81 | 45 | 62 | — |
| Chemical resistance (KOH 20%) [%] | 93 | 88 | 91 | 93 | 92 | 94 | 80 | 57 | 62 | — |
| Light resistance [%] | 89 | 90 | 89 | 90 | 90 | 90 | 83 | 30 | 55 | — |
| Haze [%] | 1.2 | 0.7 | 1.1 | 1.0 | 0.8 | 0.7 | 8.0 | 0.7 | 6.5 | 0.6 |
| Absorption rate [%] | 0.76 | 0.65 | 0.76 | 0.75 | 0.72 | 0.70 | 5.10 | 0.72 | 0.70 | 0.75 |

ISB content: The molar ratio of the residue derived from isosorbide relative to the residue derived from total diols included in the polyester resin DEG content: The molar ratio of the residue derived from diethylene glycol relative to the residue derived from total diols included in the polyester resin Tg: Tg of the polyester resin Referring to Examples 1 and 5 and Comparative Examples 1 and 3, it is confirmed that the fibers have the same thickness but exhibit different physical properties. Specifically, it is confirmed that the nylon 6 fiber of Comparative Example 1 prepared from the polyamide resin had a high initial tensile strength but had a low knot strength, a low knot strength retention ratio and a high absorption rate, and the strength retention ratio was rapidly deteriorated (poor saline water resistance) when exposed to a saline water. Further, it is confirmed that the polyester fiber of Comparative Example 3 prepared from polyethylene terephthalate had high regularity of the polymer chain, which led to the occurrence of haze after molding, and was susceptible to alkaline solution (poor chemical resistance). In contrast, the polyester resins of Examples 1 and 5 were found to have excellent haze, knot strength retention rate, saline water resistance, chemical resistance and light resistance due to a low oligomer content.

Referring to Example 2 and Comparative Example 4, the final intrinsic viscosity of the polyester resins and the thickness of the fibers were the same, but when the content of isosorbide introduced into the polyester resin exceeded 20 mol % as in Comparative Example 4, an alignment by drawing did not occur. As a result, fibers could not be formed at a draw ratio of 3 times or more from the polyester resin of Comparative Example 4, and the properties described in Experimental Example could not be evaluated.

Referring to Example 4 and Comparative Example 2, even when isosorbide was introduced in the same amount into the polyester resins, the final intrinsic viscosity of the polyester resins varied, since the initial input molar ratio of the diol was outside the appropriate range, and the content of diethylene glycol was outside the appropriate range. As a result, it was confirmed that the mechanical properties of Comparative Example 2 were insufficient.

Accordingly, it is confirmed that in order to provide polyester fibers which exhibits excellent saline water resistance, chemical resistance, light resistance and a good knot strength and which can maintain high transparency, the polyester fibers should be prepared under a specific processing condition, for example, the initial input/mixing ratio of the diol must be adjusted within an appropriate range, the content of the diol moiety derived from isosorbide and the diol moiety derived from diethylene glycol introduced into the polyester resin must satisfy a specific range, the oligomer content of the polyester resin should be 1.3% by weight, and the haze measured according to ASTM D1003-97 for the specimen having a thickness of 6 mm obtained from the resin should be less than 3%.

It is confirmed that the polyester fiber according to the one embodiment of the present invention exhibits excellent characteristics described above and thus can be effectively used for fishing guts, fishing nets, pelt for paper machines, ropes, gut for rackets, carpets, rugs, mats, clothes, 3D printers, etc.

The invention claimed is:

1. A method for preparing a polyester fiber comprising the steps of:
   (a) carrying out an esterification reaction of a dicarboxylic acid including terephthalic acid thereof and a diol comprising 1 mol to 25 mol of isosorbide and 65 mol to 200 mol of ethylene glycol based on 100 mol of the total dicarboxylic acid;
   (b) subjecting the esterification reaction product to a polycondensation reaction to prepare a polyester resin polymerized with a dicarboxylic acid including terephthalic acid and a diol including isosorbide, thereby having an alternating structure of an acid moiety derived from the dicarboxylic acid and a diol moiety derived from the diol, wherein the polyester resin includes 1 to 20 mol % of a diol moiety derived from isosorbide and 2 to 5 mol % of a diol moiety derived from diethylene glycol based on the total diol moieties derived from the diol;
   (c) melt-spinning the polyester resin obtained in step (b) at 240° C. to 310° C.; and
   (d) drawing the melt-spun undrawn fiber obtained in step (c) at a temperature equal to or higher than the glass transition temperature of the polyester resin,
   wherein, in step (a), the initial mixing molar ratio of the dicarboxylic acid to the diol is adjusted to 1:1.01 to 1.05, and
   wherein in step (b), the polycondensation is carried out so that an intrinsic viscosity, which is measured at 35° C. after dissolving the product obtained by the polycondensation reaction in orthochlorophenol at a concentration of 1.2 g/dl at 150° C. for 15 minutes, reaches 0.45 dl/g to 0.75 dl/g,
   wherein the polyester resin has an alternating structure of an acid moiety derived from the dicarboxylic acid and diol moieties derived from the diol, the dicarboxylic acid includes 90 mol % or more of the terephthalic acid based on the total dicarboxylic acid, and the polyester resin includes 1 to 20 mol % of a diol moiety derived from isosorbide, 2 to 5 mol % of a diol moiety derived from diethylene glycol, and the remainder of a diol moiety derived from ethylene glycol, based on the total diol moieties derived from the diol, and
   wherein the polyester resin has a molecular weight distribution of 2.8 to 4.0.

2. The method of preparing a polyester fiber of claim 1, further comprising removing unreacted materials including isosorbide by allowing the product obtained by the esterification reaction or the transesterification reaction to stand under a reduced pressure condition of 400 to 1 mmHg for 0.2 to 3 hours, before the (b) polycondensation reaction.

3. The method of preparing a polyester fiber of claim 1, wherein the undrawn fiber is drawn at a draw ratio of 3 times or more in step (d).

4. The method of preparing a polyester fiber of claim 1, wherein the step (d) is carried out at a temperature of 80° C. to 220° C.

5. The method of preparing a polyester fiber of claim 1, further comprising, after step (b) and before step (c), (b0-1) a step of crystallizing the polymer prepared by polycondensation reaction; and (b0-2) a step of subjecting the crystallized polymer to a solid phase polymerization such that the intrinsic viscosity, which is measured at 35° C. after dissolving the polymer in orthochlorophenol at a concentration of 1.2 g/dl at 150° C. for 15 minutes, is higher than the intrinsic viscosity of the resin obtained in step (b) by 0.05 to 0.40 dl/g.

6. The method of preparing a polyester fiber of claim 1, wherein the polyester resin has an oligomer content of 1.3% by weight or less and a haze of less than 3% as measured according to ASTM D1003-97 for a specimen having a thickness of 6 mm obtained from the polyester resin.

* * * * *